UNITED STATES PATENT OFFICE.

HUGH RODMAN, OF PITTSBURG, PENNSYLVANIA, ASSIGNOR, BY MESNE ASSIGNMENTS, TO WESTINGHOUSE STORAGE BATTERY COMPANY, A CORPORATION OF NEW YORK.

PROCESS OF TREATING OR IMPREGNATING PLANTÉ NEGATIVE PLATES.

944,822.            Specification of Letters Patent.      Patented Dec. 28, 1909.

No Drawing.       Application filed March 24, 1906. Serial No. 307,929.

*To all whom it may concern:*

Be it known that I, HUGH RODMAN, a citizen of the United States, and a resident of Pittsburg, in the county of Allegheny and State of Pennsylvania, have made a new and useful Invention in Processes of Treating or Impregnating Planté Negative Plates, of which the following is a specification.

Planté negative pole plates for use in storage batteries are in many respects superior to pasted negative pole plates. Their use, however, has been limited because of the gradual shrinkage and the loss of initial capacity of the active material; a fault overcome in pasted plates by the mechanical admixture of a so-called "expander".

This invention relates to Planté negative pole plates and to a method of impregnating negative pole plates so that the pores of the active mass, or the mass to become active, of such plates contain an expander in the form of finely-divided, inert, insoluble substances placed therein after the formation of said pores.

The impregnation is preferably carried out by soaking the plates in one solution and subsequently in a second solution, the two solutions reacting chemically to produce an insoluble, finely-divided substance within the pores of the active mass or the mass to become active.

One method of obtaining the desired impregnation consists in dipping the dried plates (either finished or in course of manufacture) into a solution of a soluble salt of the strontium barium group, such as barium nitrate (preferably a saturated solution) and subsequently into a dilute solution of a soluble sulfate, such as sulfuric acid or sodium sulfate, thus precipitating by the chemical reaction barium sulfate in a finely-divided state in the pores of the mass.

Having now particularly described and ascertained the nature of my invention and in what manner the same may be performed, I declare that what I claim is:

1. The method of reducing depreciation in Planté negative plates, which consists in impregnating the active mass or mass to become active, with a compound of the barium group.

2. The method of reducing depreciation in Planté negative plates, which consists in impregnating the active mass, or the mass to become active, with an inert finely divided barium compound.

3. The method of reducing depreciation in Planté negative plates, which consists in impregnating the active mass, or the mass to become active, with a finely divided sulfate of the barium group.

4. The method of reducing depreciation in Planté negative plates, which consists in impregnating the active mass, or the mass to become active, with finely divided barium sulfate.

5. The method of reducing depreciation in Planté negative plates, which consists in precipitating within the active mass, or the mass to become active thereof, a finely divided inert compound of the barium group.

6. The method of reducing depreciation in Planté negative plates, which consists in precipitating within the active mass, or the mass to become active thereof, a finely divided inert barium compound.

7. The method of reducing depreciation in Planté negative plates, which consists in precipitating within the active mass, or mass to become active thereof, a finely divided sulfate of the barium group.

8. The method of reducing depreciation in Planté negative plates, which consists in precipitating within the active mass, or mass to become active thereof, finely divided barium sulfate.

9. The method of reducing depreciation in Planté negative plates, which consists in impregnating the active mass, or the mass to become active thereof, with a solution of a substance and subsequently treating the mass with a chemical reagent to deposit in the active mass an inert insoluble substance.

10. The method of reducing depreciation in Planté negative plates, which consists in impregnating the active mass, or the mass to become active thereof, with a soluble compound of the barium group and subsequently treating the mass with a chemical reagent which reacts with the compound to deposit within the active mass an inert insoluble substance.

11. The method of reducing depreciation in Planté negative plates, which consists in impregnating the active mass, or the mass to become active thereof, with a soluble barium compound and subsequently treating the mass with a chemical reagent which reacts with the barium compound to deposit within the pores of the active mass an inert finely divided insoluble substance.

12. The method of reducing depreciation in storage batteries, which consists in impregnating the active mass or the mass to become active thereof, with a solution of a substance and subsequently treating the mass with a fluid reagent to deposit within the pores of the active mass an inert insoluble finely divided substance.

13. The method of reducing depreciation in negative electrodes of lead storage batteries, which consists in precipitating within the active mass or the mass to become active thereof, a finely divided insoluble compound of the barium group.

14. The method of reducing depreciation in lead storage batteries, which consists in precipitating within the active mass, or mass to become active, a finely divided insoluble barium compound.

15. The method of reducing depreciation in lead storage batteries which consists in precipitating within the active mass, or the mass to become active, finely divided barium sulfate.

16. The method of reducing depreciation in lead storage batteries, which consists in precipitating within the active mass, or the mass to become active, of the negative electrodes a finely divided sulfate of the barium group.

17. The method of reducing depreciation in lead storage batteries, which consists in treating the active mass, or the mass to become active, of the negative electrodes, with solutions which eventually precipitate within the mass finely divided sulfate of the barium group.

18. The method of reducing depreciation in lead storage batteries which consists in treating the active mass, or the mass to become active, of the negative electrodes with solutions which eventually precipitate within the mass finely divided barium sulfate.

19. The method of reducing depreciation in storage batteries which consists in treating the negative pole plates carrying a porous mass with two solutions which eventually precipitate within the pores of the mass a finely divided, inert, insoluble substance.

20. The method of reducing depreciation in Planté negative plates which consists in moistening the active mass, or mass to become active, with solutions which eventually precipitate within the pores of the mass finely divided sulfate of the barium group.

21. A Planté formed negative plate carrying active material impregnated with a finely divided barium sulfate.

22. A Planté formed negative plate carrying active material impregnated with a finely divided sulfate of the barium group.

23. A Planté formed negative plate carrying active material impregnated with a sulfate of the barium group.

24. A Planté formed negative plate carrying active material impregnated with barium sulfate.

25. The process of treating formed plates to be used as negative pole plates, which consists in impregnating the previously formed pores thereof with a solution of a substance capable of modification to form an insoluble inactive material, and then, as a subsequent procedure, modifying the said substance by a chemical reagent while within the pores thereby depositing such insoluble inactive material.

26. The process of treating plates to be used as negative pole plates which consists in soaking the plate in a solution of a substance capable of penetrating the pores and of forming by the action of an appropriate chemical reagent a deposit of an insoluble inactive substance and then removing the plate and subjecting the plate to the action of said reagent thereby causing the formation of such insoluble inactive substance within the pores.

27. The process of treating plates to be used as negative pole plates which consists in soaking the previously formed plate in a solution of a substance capable of penetrating the pores and of forming with the aid of a suitable chemical reagent, an insoluble deposit of inactive material and subsequently removing the plate from the solution and exposing the plate to the action of said reagent and thereby producing within its pores deposits of insoluble inactive material.

28. The process of treating plates for use as negative pole plates after forming which consists in precipitating in the pores of the plate by the reaction of two solutions insoluble, inactive material in a finely divided state.

29. The process of treating plates carrying a porous active mass to be used as negative pole plates which consists in impregnating the existing pores of said active mass with a solution of a substance and as a subsequent procedure precipitating finely divided, insoluble, inert material within said pores by means of a chemical reagent.

30. The process of treating plates for use as negative pole plates characterized by the step of soaking the plate and impregnating its pores with a solution of a substance capable of producing with the aid of an appropriate chemical reagent, an inert material in said pores.

31. The process of treating plates for use as negative pole plates characterized by the step of soaking the plate in and impregnating its pores with a solution of a substance capable of producing with the aid of an appropriate chemical reagent an inert material in the said pores and by the further step of subjecting such material while in the pores to the reagent and thereby producing within the pores an inert material.

32. The method of treating plates to be used as negative pole plates which consists in soaking the previously formed plate in a solution of a soluble salt of the strontium barium group.

33. The method of treating plates to be used as negative pole plates which consists in soaking the previously formed plate in a solution of barium nitrate.

In testimony whereof, I have hereunto subscribed my name this 22nd day of March, 1906.

HUGH RODMAN.

Witnesses:
CHARLES W. MCGHEE,
E. W. MCCALLISTER.